United States Patent [19]

Urayama

[11] Patent Number: 4,574,320

[45] Date of Patent: Mar. 4, 1986

[54] DICTATING MACHINE HAVING A REVISING FUNCTION

[75] Inventor: Yuji Urayama, Maebashi, Japan

[73] Assignee: Victor Company of Japan Ltd., Yokohama, Japan

[21] Appl. No.: 565,630

[22] Filed: Dec. 27, 1983

[30] Foreign Application Priority Data

Dec. 28, 1982 [JP] Japan .......................... 57-200363[U]

[51] Int. Cl.$^4$ ........................................... G11B 15/12
[52] U.S. Cl. .................................... 360/62; 360/33.1
[58] Field of Search ..................... 360/22, 61, 62, 63

[56] References Cited

U.S. PATENT DOCUMENTS 4,203,139  5/1980  Horiochi .............................. 360/61
4,354,209  10/1982  Saro et al. ........................... 360/61
4,356,519  10/1982  Cogdell, Jr. ......................... 360/61

FOREIGN PATENT DOCUMENTS 2339731  5/1974  Fed. Rep. of Germany ........ 360/61
2837791  3/1980  Fed. Rep. of Germany ........ 360/61

Primary Examiner—Vincent P. Canney
Attorney, Agent, or Firm—Roberts, Spiecens & Cohen

[57] ABSTRACT

A dictating machine having a revising function, records a correction signal onto a magnetic tape in superimposition with an originally recorded content when correcting the originally recorded content or adding a content to the originally recorded content so as to accurately indicate a position where the correction or the addition is required, without erasing the originally recorded content. The dictating machine is capable of recording a new content onto the magnetic tape with a large degree of freedom without erasing the originally recorded content, because the new content is recorded on a track on the magnetic tape which is different from the track on which the original contents are recorded.

7 Claims, 1 Drawing Figure

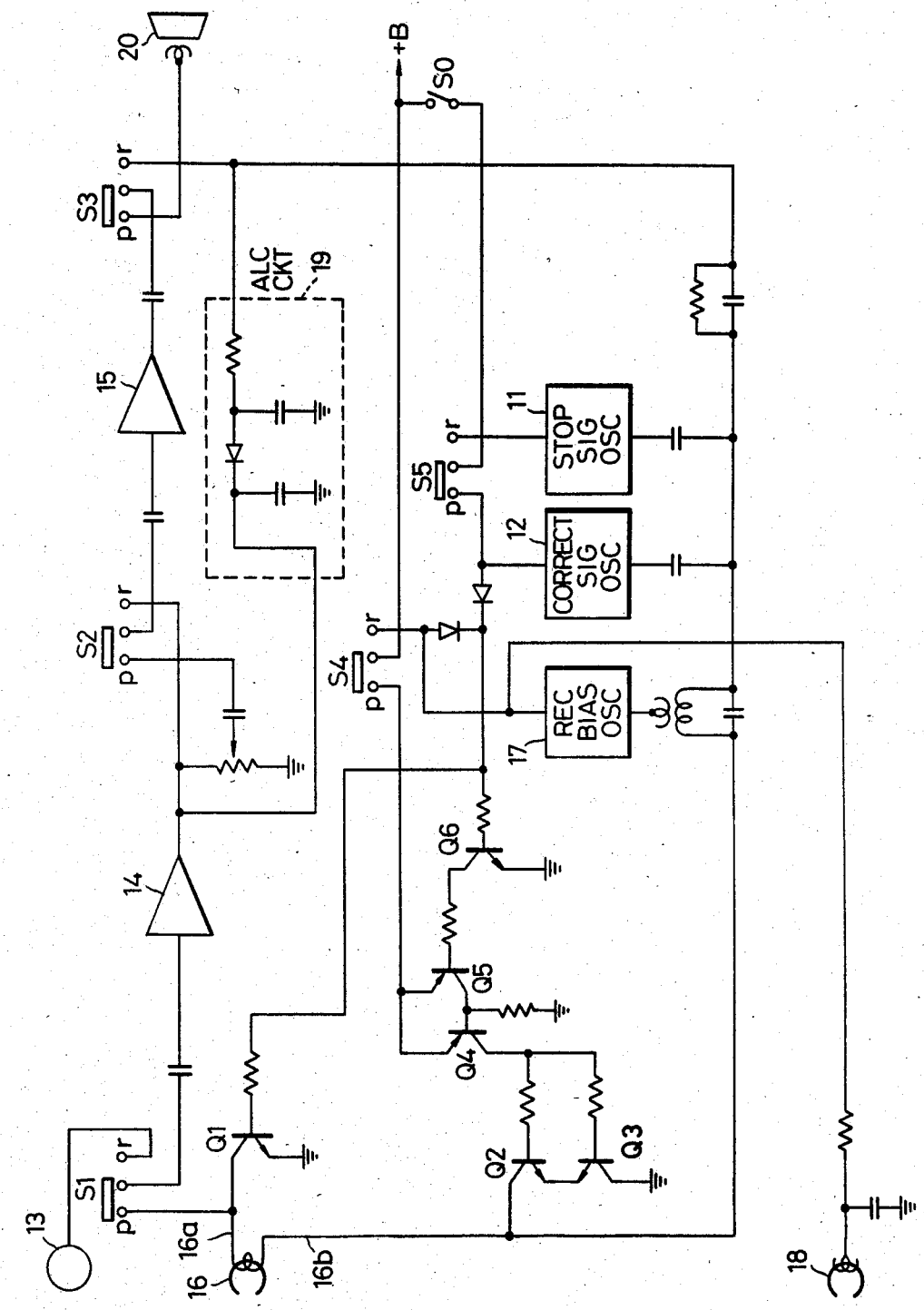

DICTATING MACHINE HAVING A REVISING FUNCTION

BACKGROUND OF THE INVENTION

The present invention generally relates to dictating machines having a revising function, and more particularly to a dictating machine which records a correction signal onto a magnetic tape in superimposition with an originally recorded content when correcting the originally recorded content or adding a content to the originally recorded content so as to accurately indicate a position where the correction or the addition is required, without erasing the originally recorded content, and which is capable of recording a new content onto the magnetic tape with a large degree of freedom without erasing the originally recorded content.

Generally, a dictating machine is used to record a message onto a magnetic tape. When recording a plurality of messages by the dictating machine, it is desirable that two subsequent messages are clearly distinguishable upon reproduction. Accordingly, there was a conventional dictating machine which recorded a stop signal called a letter-end-marker and the like, between the two subsequent messages. Such a stop signal was recorded when a recording operator pushed a push-button switch when the recording of a message was completed. When this push-button switch was pushed, a stop signal oscillator operated for a predetermined time, and a signal of 40 Hz, for example, was produced for approximately 2.5 seconds.

When playing the tape which has been recorded with the messages in the dictating machine, the tape is caused to travel at a tape speed which is identical to the tape speed at the time of the recording. In a case where a typist is a playing operator, for example, the typist types the message which is reproduced from the tape. When one message among a plurality of messages is to be reproduced, a predetermined recorded position of this one message can be searched, by causing the tape to travel at a tape speed which is higher than the tape speed at the time of the recording and counting the number of stop signals which are reproduced.

Further, there was a conventional dictating machine which was designed to record an instruction signal called an insertion-marker and the like, in addition to the above stop signal. This instruction signal was recorded when the recording operator wanted to record instructions intended for the typist and the like. The instruction was recorded immediately after the instruction signal. Accordingly, when the instruction signal was reproduced at the time of reproduction, the typist listened to the instructions which followed, and typed the message which followed the instructions in accordance with the instructions.

There are times when the recording operator decides to correct a recorded content of the message or add a content to the recorded content of the message, after the message has been recorded. When correcting the recorded content of the message in the conventional dictating machine, a tape counter and the like was used to find the part on the tape where the correction was required. A new content which was to replace the originally recorded content of the message, was then recorded from the above part which has been found. The originally recorded content of the message was erased as the new content was recorded.

However, according to the above correcting method, it was technically difficult to accurately replace only the content in the message which required the correction with the new content. That is, a part of the recorded content which was actually required was sometimes erased erroneously, and a part of the recorded content which was actually not required was sometimes left unerased. Especially when the required recorded content was erased erroneously, it became necessary to record all of the contents of the message all over again from the beginning of the message. On the other hand, when the unrequired recorded content was left unerased, the newly recorded content did not connect smoothly to the subsequent recorded content, and in some cases, the typist was unable to correctly understand the recorded contents of the message.

When the content which required the correction was recorded over a predetermined length of tape, and the length of tape which was required to record the new content was smaller than the above predetermined length, it was possible to record all of the new content, however, a part of the unrequired content was inevitably left unerased. On the other hand, when the length of tape which was required to record the new content was greater than the above predetermined length, it was impossible to record all of the new content. Hence, in this case, there was a disadvantage in that it was impossible to correct only the unrequired content in the message, and for this reason, the same message including the new content had to be recorded all over again from the beginning of the message. Moreover, when adding a new content to the recorded content in the message, it was impossible to record the new content unless the same message including the newly added content was recorded all over again from the beginning of the message.

SUMMARY OF THE INVENTION

Accordingly, it is a general object of the present invention to provide a novel and useful dictating machine having a revising function, in which the above described disadvantages have been eliminated.

Another and more specific object of the present invention is to provide a dictating machine having a revising function, which records a correction signal onto a magnetic tape in superimposition with an originally recorded content when correcting the originally recorded content or adding a content to the originally recorded content so as to accurately indicate a position where the correction or the addition is required, without erasing the originally recorded content, and which is capable of recording a new content onto the magnetic tape with a large degree of freedom without erasing the originally recorded content. According to the dictating machine of the present invention, the recorded content which is actually required, will be prevented from being erroneously erased when correcting the recorded content or adding a content to the recorded content. In addition, the new content can be recorded with a large degree of freedom, regardless of the length of tape over which the content which requires the correction or addition is recorded. Further, because the correction signal is recorded in superimposition with the recorded content, it is unnecessary to provide a special recording section for recording the correction signal.

Other objects and further features of the present invention will be apparent from the following detailed description when read in conjunction with the accompanying drawings.

BRIEF DESCRIPTION OF THE DRAWING

The Drawing shows a circuit diagram showing an essential part of an embodiment of a dictating machine according to the present invention.

DETAILED DESCRIPTION

Drawing shows a circuit diagram of an essential part of an embodiment of a dictating machine according to the present invention. In FIG. 1, switches $S_1$ through $S_5$ are linked. Movable contacts of each of the switches $S_1$ through $S_5$ are connected to respective terminals r during a recording mode, and connected to terminals p during a play mode. A push-button switch $S_o$ is a switch for recording a stop signal and a correction signal as will be described later on in the specification, and is coupled between a power source +B and the switch $S_5$. A stop signal oscillator 11 is coupled to the terminal r of the switch $S_5$, and a correction signal oscillator 12 is coupled to the terminal p of the switch $S_5$.

First, description will be given with respect to the operation of the dictating machine during the recording mode. When setting the mode of the dictating machine to the recording mode, a recording operator turns a recording button (not shown) ON. The movable contacts of the linked switches $S_1$ through $S_5$, are connected to the respective terminals r when the recording button is turned ON. Accordingly, an audio signal from a microphone 13 passes through a switch $S_1$, an amplifier 14, a switch $S_2$, an amplifier 15, and a switch $S_3$, and is supplied to a recording and reproducing magnetic head 16. In addition, because the movable contact of the switch $S_4$ is also connected to its terminal r, the power source voltage +B is supplied to a recording bias oscillator 17 through the switch $S_4$, to put the recording bias oscillator 17 in an operating state. Thus, a bias current from the recording bias oscillator 17 is superimposed with the audio signal from the microphone 13, and this superimposed signal is supplied to the magnetic head 16.

The power source voltage +B is also applied to bases of NPN type transistors $Q_1$ and $Q_6$ through the switch $S_4$, and turns these transistors $Q_1$ and $Q_6$ ON. On the other hand, NPN type transistors $Q_2$ and $Q_3$ and PNP type transistors $Q_4$ and $Q_5$ remain in OFF states, because the power source voltage +B is not applied to these transistors $Q_2$ through $Q_5$. Hence, one terminal 16a of the magnetic head 16 becomes grounded because the transistor $Q_1$ is ON. Further, a current from the power source +B is supplied to an erasing head 18. Accordingly, the superimposed signal comprising the audio signal and the bias current, is recorded onto a traveling magnetic tape (not shown) by the magnetic head 16, while the erasing head 18 erases the recorded signal on the magnetic tape at a stage preceding the magnetic head 16.

The output signal of the amplifier 15 is supplied to an automatic level control (ALC) circuit 19, through the switch $S_3$. The ALC circuit rectifies and smoothens the output signal of the amplifier 15, and converts the signal into a D.C. voltage which is in accordance with the level of the signal. The output D.C. voltage of the ALC circuit 19, is fed back to the input side of the amplifier 15 through the switch $S_2$, so as to control the recording level to a constant level.

During the period in which the recording button is ON, a message which is picked up by the microphone 13 is recorded onto the tape by the magnetic head 16. In order to clearly distinguish the recorded message with a message which is recorded subsequently, a stop signal recorded at the end of the recorded message. The recording operator pushes the push-button switch $S_o$ when recording the stop signal. When the switch $S_o$ is closed, the power source voltage +B is applied to the stop signal oscillator 11 through the switches $S_o$ and $S_5$, and the stop signal oscillator 11 is put into an operating state for a predetermined time. A switch which automatically opens after a predetermined time elapses from the time when the switch is closed, for example, may be used for the switch $S_o$ in order to put the stop signal oscillator 11 in the operating state for the predetermined time. For example, the stop signal oscillator 11 produces a stop signal having a frequency of 40 Hz for approximately 2.5 seconds. The stop signal is recorded onto the tape as a signal indicating an end of a message (and a beginning of a subsequent message). When the recording of the message is completed, the recording operator pushes a stop button (not shown). The recording button is turned OFF when the stop button is pushed, and the mode of the dictating machine is returned to the initial mode, that is, the stop mode.

Next, when setting the mode of the dictating machine to the play mode, a playing operator turns a play button (not shown) ON. When the play button is turned ON, the movable contacts of the linked switches $S_1$ through $S_5$ connect to the respective terminals p. In this state, the power source voltage +B is not applied to the bases of the transistors $Q_1$ and $Q_6$, and the transistors $Q_1$ and $Q_6$ are OFF. On the other hand, the power source voltage +B is applied to emitters of the transistors $Q_4$ and $Q_5$ through the switch $S_4$. Thus, the base of the transistor $Q_4$ becomes reverse biased, and the transistor $Q_4$ is turned ON. As a result, the transistors $Q_2$ and $Q_3$ which have bases connected to the collector of the transistor $Q_4$, are respectively turned ON. Hence, in the play mode, the other terminal 16b of the magnetic head 16 becomes grounded.

The signal which is reproduced from the tape by the magnetic head 16 which is in the reproducing state, is passed through the switch $S_1$, the amplifier 14, the switch $S_2$, the amplifier 15, and the switch $S_3$, and is supplied to a speaker 20. Hence, the message which was recorded on the tape, is reproduced through the speaker 20. During the play mode, the power source voltage +B is not applied to the recording bias oscillator 17. Accordingly, the bias current will not be supplied to the magnetic head 16, and the magnetic head 16 carries out a reproducing operation. In addition, the current from the power source +B is not supplied to the erasing head 18, which means that the erasing head 18 does not carry out an erasing operation. When the reproduction of the desired message is completed, the playing operator pushes the stop button to put the dictating machine in the stop mode.

When searching for a predetermined message among a plurality of messages which are recorded on the tape, the tape is caused to travel at a tape speed which is higher than the tape speed at the time of the recording. In this case, because the tape is traveling at a tape speed which is higher than the tape speed at the time of the recording, the stop signal is reproduced at a frequency which is higher than the frequency at the time of the recording. The playing operator can find the predetermined message based on the stop signals which are reproduced from the tape.

Next, description will be given with respect to the manipulation and operation of the dictating machine when correcting a recorded content. When there is a need to correct a recorded content, the dictating machine is put into the play mode to search for the recorded content which is to be corrected. The message which includes the recorded content which is to be corrected, may be found by causing the tape to travel at a tape speed which is higher than the tape speed at the time of the recording and searching for this recorded content based on the stop signals which are reproduced from the tape as described before. When the recorded content which is to be corrected is found, the revising operator closes the push-button switch $S_o$ at the point when this recorded content is reproduced. When the switch $S_o$ is closed, the power source voltage $+B$ is applied to the bases of the transistors $Q_1$ and $Q_6$ through the switches $S_o$ and $S_5$, and the transistors $Q_1$ and $Q_6$ are turned ON. The transistor $Q_4$ is turned OFF when the transistor $Q_6$ is turned ON, and the transistors $Q_2$ and $Q_3$ are accordingly turned OFF. The terminal $16a$ of the magnetic head 16 is grounded because the transistor $Q_1$ is turned ON and the transistors $Q_2$ and $Q_3$ are turned OFF.

At the same time, because the switch $S_o$ is closed, the power source voltage $+B$ is applied to the correction signal oscillator 12 through the switches $S_o$ and $S_5$, to put the correction signal oscillator 12 in an operating state for a predetermined time. Accordingly, a correction signal having a frequency of 1.5 kHz, for example, is produced from the correction signal oscillator 12 for the predetermined time, and supplied to the magnetic head 16. Therefore, the correction signal is recorded by the magnetic head 16, in superimposition with the recorded content which is to be corrected.

When correcting the recorded content, the power source voltage $+B$ is not applied to the recording bias oscillator 17 and the erasing head 18. For this reason, the recording bias oscillator 17 does not operate, and the erasing head 18 does not carry out the erasing operation. Hence, the recorded content will not be erased, and will remain on the tape.

After the correction signal is recorded by closing the switch $S_o$ for the predetermined period, the revising operator reverses the side of the tape. That is, if the tape is accommodated in a cassette, the side of the cassette is reversed so as to change the recording and reproducing track from a track A (forward track, for example) to a track B (reverse track, for example). Next, the revising operator turns the recording button ON, to put the dictating machine in the recording mode as described before. A new content which is to replace the recorded content, is recorded on the track B on the tape. For the reason which will be described later on in the specification, it is desirable to record the stop signal before starting the recording of the new content. Since the new content is recorded on the track which is different from the track which is recorded with the content which is to be corrected, no problems will be introduced even if the content which is to be corrected is recorded over a predetermined length of tape and the length of tape required to record the new content is greater than the predetermined length of tape. After the recording of the new content is completed, the revising operator pushes the stop button to put the dictating machine in the stop mode.

The operation to add a new content to the recorded content, is the same as in the case of the correction described heretofore, and description thereof will be omitted. However, when adding a new content, the correction signal is recorded immediately after a content which is to precede the new content is reproduced. As in the case of the correction described before, the correction signal is recorded on the tape in superimposition with the recorded content when adding the new content. Thus, the recorded content will remain unerased.

Next, description will be given with respect to the manipulation of the dictating machine when reproducing a message which includes the above correction or addition of a content. In this case, the playing operator turns the play button ON as in the case described before so as to reproduce the message, but the correction signal will be reproduced if there is a correction or addition of a content in the message which is reproduced. When the correction signal is reproduced, the playing operator pushes the stop button to once interrupt the reproducing operation, and reverses the side of the tape. The playing operator then puts the dictating machine in the play mode again, to reproduce the new content which is to replace the content recorded on the other side of the tape or which is to be added to the content recorded on the other side of the tape. When the reproduction of the new content is completed, the playing operator puts the dictating machine in a rewind mode to rewind the tape to the beginning of the new content. The beginning of the new content can be found more easily when rewinding the tape, if the stop signal is recorded at the beginning of the new content as described before. When the beginning of the new content is reached by rewinding the tape, the dictating machine is put into the stop mode and the side of the tape is again reversed. If the message contains further contents which need to be reproduced, the reproduction of the message can be resumed by pushing the play button.

The frequency of the stop signal which indicates the end of the message (or the beginning of the new content), and the frequency of the correction signal which indicates the position where the correction is to be made or the position where the new content is to be added, are selected to mutually different frequencies. Thus, the playing operator can easily discriminate the two signals. The correction signal may also be recorded at the end of the new content which is recorded when correcting or adding a content.

A stereo type magnetic head may be used for the magnetic head 16. In this case, a right channel is used to normally record the message, for example, and a left channel is used to record the new content when correcting or adding a content. By employing the stereo type magnetic head, it becomes unnecessary to reverse the side of the tape when recording the new content. Moreover, one channel in each of the tracks A and B of the tape can be reserved for recording the message. Therefore, the recording capacity can be doubled compared to the embodiment described heretofore in which the track A is reserved for recording the message and the track B is reserved for only recording the new content.

Further, the present invention is not limited to these embodiments, but various variations and modifications may be made without departing from the scope of the present invention.

What is claimed is:

1. A dictating machine having a revising function for carrying out recording and reproduction of messages with respect to a magnetic tape having at least first and second tracks, said first track being used for recording a message, said second track being used for recording a new content which is recorded when revising the message, said dictating machine comprising:

a power source;

recording signal supplying means for supplying a signal indicative of the message or the new content which is to be recorded;

recording and reproducing means for recording the output signal of said recording signal supplying means on the first or second track of said magnetic tape in a recording state thereof and for reproducing the recorded signal from the first or second track of said magnetic tape in a reproducing state thereof, said recording and reproducing means comprising a single magnetic head;

erasing means for erasing the recorded signal on the first or second track of said magnetic tape in an operating state thereof;

bias signal generating means for supplying a bias signal to said recording and reproducing means in an operating state thereof;

stop signal generating means for supplying a stop signal to said recording and reproducing means in an operating state thereof, said stop signal having a first frequency and indicating an end of the message; and correction signal generating means for supplying a correction signal to said recording and reproducing means in an operating state thereof, said correction signal having a second frequency and indicating a part in the message where a correction or addition of a content is required, said correction signal generating means supplying the correction signal to said single magnetic head during non-operating states of said erasing means and said bias signal generating means so that said single magnetic head records the correction signal over a pre-recorded signal on the first track by superimposing without erasing the pre-recorded signal, said single magnetic head recording and reproducing the signal indicative of the message on and from the first track in a first longitudinal direction of said magnetic tape, said single magnetic head recording and reproducing the signal indicative of the new content on and from the second track in a second longitudinal direction of said magnetic tape, said second longitudinal direction being opposite to said first longitudinal direction, the recording and reproduction of the signal indicative of the new content on and from the second track in said second longitudinal direction being realized by reversing the side of the magnetic tape.

2. A dictating machine as claimed in claim 1 which further comprises first switching means and second switching means, said first switching means being coupled to said power source, said recording signal supplying means, said single magnetic head, said erasing means, said bias signal generating means, said stop signal generating means and said correction signal generating means, said first switching means carrying out a switching operation during a recording mode of said dictating machine so that said single magnetic head assumes a recording state and the output signal of said recording signal supplying means is supplied to said single magnetic head, said erasing means and said bias signal generating means being respectively coupled to said power source and assuming the operating states, said single magnetic head assuming a reproducing state during a play mode of said dictating machine, said second switching means being coupled to said power source and said first switching means and being selectively closed for a predetermined time, said first switching means coupling said stop signal generating means to said second switching means during the recording mode so that said stop signal generating means assumes its operating state while said second switching means is closed, and coupling said correction signal generating means to said second switching means during the play mode so that said correction signal generating means assumes its operating state while said second switching means is closed.

3. A dictating machine as claimed in claim 2 in which said first switching means includes a transistor switching circuit for grounding a first terminal of said single magnetic head during the recording mode and for grounding a second terminal of said single magnetic head during the play mode.

4. A dictating machine as claimed in claim 1 in which said stop signal generating means generates a stop signal having frequency of 40 Hz, and said correction signal generating means generates a correction signal having a frequency of 1.5 kHz.

5. A dictating machine as claimed in claim 2 in which said predetermined time in which said second switching means is closed is approximately equal to 2.5 seconds.

6. A dictating machine as claimed in claim 2 in which said second switching means is closed after a recording of the signal indicative of a message is completed during the recording mode, and is closed at a point where a revision is required during the play mode.

7. A dictating machine as claimed in claim 1 in which said magnetic tape is accommodated within a cassette case, the side of the magnetic tape being reversed by reversing the side of said cassette case.

* * * * *